J. R. HARRIS.
COAT ATTACHMENT OR HITCH.
APPLICATION FILED SEPT. 7, 1909.
987,983.
Patented Mar. 28, 1911.
Fig. 1.
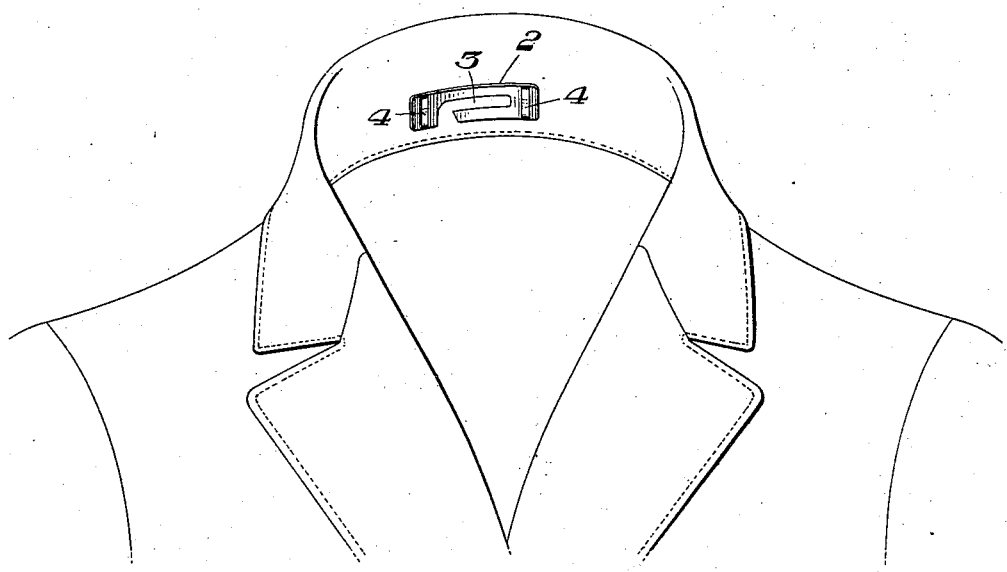
Fig. 2.
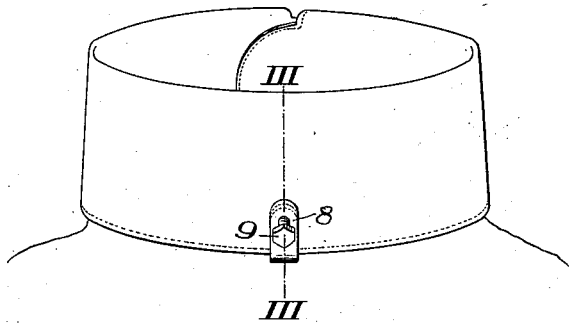
Fig. 3.
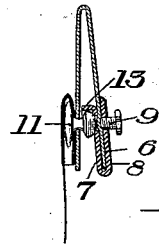
Fig. 4.
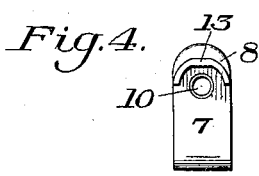
Fig. 5.
Fig. 7.
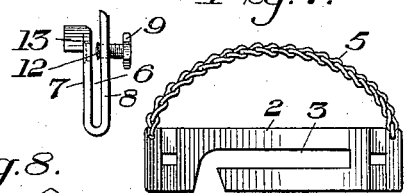
Fig. 6.
Fig. 8.
WITNESSES
INVENTOR
Jno. R. Harris,
by Bakewell, Byrnes & Parmelee,
his Attys.
THE NORRIS PETERS CO., WASHINGTON, D. C.

UNITED STATES PATENT OFFICE.

JOHN ROYAL HARRIS, OF PITTSBURG, PENNSYLVANIA.

COAT ATTACHMENT OR HITCH.

987,983.  Specification of Letters Patent. Patented Mar. 28, 1911.

Application filed September 7, 1909. Serial No. 516,329.

*To all whom it may concern:*

Be it known that I, JOHN ROYAL HARRIS, of the city of Pittsburg, county of Allegheny, and State of Pennsylvania, have invented a new and useful Improvement in Coat Attachments or Hitches, of which the following is a full, clear, and exact description, reference being had to the accompanying drawings, forming part of this specification, in which—

Figure 1 is a partial view of a coat provided with my improved attachment or hitch. Fig. 2 is a perspective view showing the hitch or attachment applied to a turn over collar; Fig. 3 is a section on the line III—III of Fig. 2. Figs. 4 and 5 are detail views of the collar clip. Fig. 6 is a view showing one form of blank from which the collar clip may be made. Fig. 7 is a detail view of a modified form of the hitch plate, and Fig. 8 is a perspective view of a fastening device for the hitch plate.

My invention is designed to provide a collar hitch of novel character by which the collar of the coat may be fastened to the rear collar button in such a manner as to prevent the coat collar from shifting its position.

A further object of the invention is to provide a device of this character which shall be simple in its construction, which can be cheaply manufactured, which can be quickly and easily applied in use, and which will be compact in form and will not deform or distort the appearance of the coat collar.

A still further object of the invention is to provide a device which can be used for both standing and turn-over collars.

In the drawings, the numeral 2 designates the hitch plate, which preferably consists of a small, thin piece of sheet metal, having a bayonet slot 3 therein, the entrance of said slot opening downwardly. This plate is secured to the inner side of the coat collar in any desired manner, as by stitching, or by means of fasteners 4 of the ordinary McGill type, which may be passed through slots or openings at the end portions of the plates and pushed through the inner band of the coat collar and expanded. The plate is secured to one side of the center of the collar, so that when the rear collar button is pushed in the bayonet slot it will normally lie near the closed end of such slot. The slot is of sufficient length to insure the retention of the collar button in the slot, and its upper and lower walls engage the shank of the button to effectively prevent vertical movement of the coat collar. The curvature of the plate is preferably such as to perfectly conform to the natural curvature of the inner surface of the coat collar, so that there will be no distortion or bulging of such collar.

The device not only holds the coat collar in correct position, but it prevents it from pulling away from the linen collar and also from slipping up on the collar.

The fixture may be applied to the coat collar without removing the usual inner coat hanger and either above or below the same, although the coat hanger may be moved down if desired.

The plate 2 may also be provided with a hanger chain 5, as shown in Fig. 7, which will take the place of the usual coat hanger.

If used with turn over or turn down collars, I employ the supplemental device which is shown in Figs. 2, 3, 4, 5 and 6. This device consists of a U-shaped clip having a space 6 between its parallel front and rear members 7 and 8 of the proper width to receive the lower edge of the rear portion of the linen collar. Seated in the back or rear member 8 of this clip is a screw button 9, which is adapted to be turned so as to bite the linen collar in the manner shown in Fig. 3, the opposite member 7 of the clip being preferably provided with a small aperture 10 opposite the convex point of the screw, into which the material of the linen collar may be partially forced in order to secure a better bite thereon. The screw 9 also acts as a button for engagement with the bayonet slot of the coat hitch plate 2, in the same manner as the engagement of the collar button with such slot in the case of a standing collar. The inner edge of the opening 10 is preferably beveled or counter-sunk so as to receive the head of the collar button 11, as indicated in Fig. 3, thereby forming a bearing for said button and also enabling the linen collar to lie as closely to the coat collar as possible. The inner end of the screw 9 is preferably upset as indicated at 12 to prevent the possibility of its accidental withdrawal. The inner member 7 of the clip is also preferably formed at its upper end with the inwardly inclined flange 13, which is adapted to have a supporting engagement with the head of the collar button 11, as shown in Fig. 3. The clip may be conveniently formed from a blank such as shown in Fig. 6, which is doubled upon itself and into the form shown in Figs. 4 and 5. This blank can be readily stamped from thin sheet metal. The metal employed may be light, but should be of sufficiently rigid character so that the pressure of the screw button against the material of the linen collar will not materially separate the two parts of the clip. The clip should fit the material of the linen collar closely, but with sufficient freedom so that its two parts will not have to be forced apart as it is slipped over the fold of the collar.

The device as shown and described is extremely simple in its construction, consisting as it does of two simple sheet metal pieces and a screw also acting as a button. The clip device is placed in position before the collar is buttoned to the shirt and remains until the collar is discarded. The turn down fold of the collar is caught between two members of the clip, so that the screw button comes just above the buttonhole in the back of the linen collar. The screw button is then turned, bringing the point of the same against the collar, forcing the material thereof into the aperture 10. The pressure of the screw together with the engagement of the clip with the collar, holds it firmly in position without injury to the collar; and it may be readily removed by turning the screw button. The device not only gives a secure attachment to the collar button, but the engagement of the projecting clip or flange 13 with the collar button brings the weight of the suspended coat upon the collar button and prevents any sidewise slipping. The parts being made of thin material, require but little space, they are hidden by the coat collar when in use, and their form and arrangement is such that there is no visible bulging of the coat collar outwardly.

Many changes may be made in the form and arrangement of the hitch plate and of the clip, within the spirit and scope of my invention as defined in the appended claims.

I claim:

1. In a coat hitch, a clip comprising a U-shaped piece of metal adapted to embrace the fold of a collar, and a screw seated in one arm of the clip and arranged to bite the material of the collar, the shank of said screw being extended to form a button for engagement with a hitch plate, and the opposite arm of the clip having its free edge shaped to form a projecting flange to fit over the head of a collar button; substantially as described.

2. In a coat hitch, a clip comprising a U-shaped piece of metal adapted to embrace the fold of a collar, and a screw seated in one arm of said clip opposite a perforation through the other arm and arranged to force the material of the collar into said perforation, the shank of said screw being extended to form a button for engagement with a coat hitch plate, and said perforation being countersunk on its outer side and said other arm having a projecting flange above the perforation, the countersink being to receive a portion of the head of a collar button, and the flange being designed to have a supporting engagement with a collar button; substantially as described.

In testimony whereof, I have hereunto set my hand.

JNO. ROYAL HARRIS.

Witnesses:
GEO. B. BLEMING,
R. A. BALDERSON.

Copies of this patent may be obtained for five cents each, by addressing the "Commissioner of Patents, Washington, D. C."